(12) United States Patent
Johnson

(10) Patent No.: US 11,708,164 B2
(45) Date of Patent: Jul. 25, 2023

(54) COMBINATION ENERGY IMPACT ATTENUATION, VIBRATION MITIGATION AND FLOTATION DEVICE FOR AIRCRAFT SEATING APPLICATIONS

(71) Applicant: B/E Aerospace, Inc., Winston-Salem, NC (US)

(72) Inventor: Glenn A. Johnson, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 154 days.

(21) Appl. No.: 17/234,998

(22) Filed: Apr. 20, 2021

(65) Prior Publication Data

US 2022/0332424 A1 Oct. 20, 2022

(51) Int. Cl.
*B64D 11/06* (2006.01)
*B64D 25/04* (2006.01)
*B64D 25/18* (2006.01)

(52) U.S. Cl.
CPC .......... *B64D 11/0619* (2014.12); *B64D 25/04* (2013.01); *B64D 25/18* (2013.01)

(58) Field of Classification Search
CPC ............ B64D 11/0619; B64D 11/0631; B64D 25/04; B64D 25/18
See application file for complete search history.

(56) References Cited

U.S. PATENT DOCUMENTS

| | | | |
|---|---|---|---|
| 4,204,657 A * | 5/1980 | Graham | B64D 11/0647 297/DIG. 5 |
| 4,627,587 A | 12/1986 | McCutchan et al. | |
| 4,736,932 A * | 4/1988 | Haslim | B62D 5/083 5/247 |
| 4,768,830 A * | 9/1988 | Musselwhite | B64D 11/0619 297/14 |
| 5,975,629 A | 11/1999 | Lorbiecki | |

(Continued)

FOREIGN PATENT DOCUMENTS

| BR | PI0618306 A2 | 8/2011 |
|---|---|---|
| CN | 102470921 B | 3/2015 |

(Continued)

OTHER PUBLICATIONS

Extended Search Report in European Application No. 22168219.8 dated Aug. 9, 2022, 7 pages.

*Primary Examiner* — Philip F Gabler
(74) *Attorney, Agent, or Firm* — Suiter Swantz pc llo

(57) ABSTRACT

A combination adaptive energy absorption and emergency flotation device for positioning beneath a plurality of seat pans of a seat assembly in an aircraft seating application. The device includes a plurality of fluidly coupled inflatable elastic bladders, at least one constrictor valve fluidly coupling at least two adjacent ones of the plurality of inflatable elastic bladders allowing fluid flow therethrough in response to predetermined pressure on the device from the plurality of seat pans, and a fluid supply source fluidly coupled to the plurality of inflatable elastic bladders for outputting a positive flow of fluid to the plurality of inflatable elastic bladders, wherein the adaptive energy absorption device is detached from the plurality of seat pans to allow removal from beneath the plurality of seat pans for use as an emergency flotation device.

10 Claims, 7 Drawing Sheets

(56) References Cited

U.S. PATENT DOCUMENTS

| | | | |
|---|---|---|---|
| 6,203,105 B1 | 3/2001 | Rhodes, Jr. | |
| 6,241,188 B1* | 6/2001 | Simpson | B64D 11/0649 244/122 R |
| 7,882,921 B2 | 2/2011 | Hakki et al. | |
| 8,181,292 B1* | 5/2012 | Pellettiere | B60N 2/4279 5/713 |
| 8,573,690 B2* | 11/2013 | Shoji | B60N 2/4242 297/216.1 |
| 10,364,023 B2 | 7/2019 | Azzarello | |
| 2002/0185905 A1* | 12/2002 | Cassinelli | B64D 11/06 297/440.22 |

FOREIGN PATENT DOCUMENTS

| | | | |
|---|---|---|---|
| CN | 110606207 A | 12/2019 | |
| EP | 2637929 B1 | 12/2016 | |
| EP | 3604133 B1 | 5/2021 | |
| KR | 2020110007920 U | 8/2011 | |

* cited by examiner

COMBINATION ENERGY IMPACT ATTENUATION, VIBRATION MITIGATION AND FLOTATION DEVICE FOR AIRCRAFT SEATING APPLICATIONS

BACKGROUND

Aircraft typically employ singular systems for each of energy attenuation, vibration mitigation and life-saving. For example, aircraft such as rotary wing aircraft can be equipped with impact detection systems and devices positioned in the fuselage or in seat systems for energy attenuation, vibration mitigating apparatus coupled to seat structures for reducing or preventing vibrations from transferring to the seat occupant, and deployable emergency life rafts retrievable from dedicated storage compartments.

Impact detection systems and devices can be implemented as energy absorbers, energy absorption systems, load limiters, and passenger restraint systems for mitigating occupant injury due to extreme vehicle movement. Such systems may respond to changing environmental conditions and may include controllers for real-time optimization as well as sensors for detecting occupant weight, load level, motion and acceleration.

Vibration control can be implemented as passive or active devices such as vibration isolators, electromechanical actuators, hydraulic actuators and pneumatic actuators operatively coupled to a seat frame. Active vibration control devices can be communicatively coupled to a controller, vibration sensors and position sensors to receive input signals corresponding to detected vibrations, and in response, generate command signals to instruct the vibration control devices.

Life saving devices such as life rafts provide floating support in the event of a water landing and can include activation devices for auto-inflation. In the case of rotary wing aircraft, life saving devices are typically positioned external on the aircraft and therefore may not be accessible in all emergency situations.

The singular nature of the aforementioned systems and devices contribute to the increased complexity of the aircraft and add weight. Increased weight and complexity increase the likelihood of system failure, increase fuel burn and reduce range.

Therefore, it would be desirable to combine aspects of the aforementioned systems and devices into a seating system application for aircraft such as rotary wing aircraft.

BRIEF SUMMARY

In one aspect, embodiments of the inventive concepts disclosed herein are directed to a seating system for an aircraft, for instance a rotary wing aircraft, including a seat frame defining at least one seat position including a seat back and a seat pan coupled to the seat frame, and an adaptive energy absorption device disposed beneath the seat pan of the at least one seat position. The adaptive energy absorption device includes a plurality of fluidly coupled inflatable elastic bladders and at least one constrictor valve for allowing fluid to flow from one of the plurality of inflatable elastic bladders in response to predetermined pressure on the adaptive energy absorption device from the seat pan of the at least one seat position. A fluid supply source is fluidly coupled to the at least one inflatable elastic bladder operable for outputting a positive flow of fluid to the at least one inflatable elastic bladder. The adaptive energy absorption device is detached from the seat frame to allow removal from beneath the seat pan of the at least one seat position for use as an emergency flotation device as needed.

In some embodiments, the seat frame may define at least two laterally adjacent seat positions and the adaptive energy absorption device may span continuously across the at least two laterally adjacent seat positions.

In some embodiments, the adaptive energy absorption device may include a plurality of fluidly coupled inflatable elastic bladders forming a vertical stack.

In some embodiments, the at least one constrictor valve may be disposed between fluidly coupled adjacent ones of the plurality of inflatable elastic bladders to allow fluid to flow between the fluidly coupled adjacent ones of the plurality of inflatable elastic bladders.

In some embodiments, the at least one constrictor valve may be disposed in one of the plurality of inflatable elastic bladders to allow fluid escape out of the adaptive energy absorption device.

In some embodiments, the seating system may further include a controller communicatively coupled to the fluid supply source operable for activating the fluid supply source to output fluid to the adaptive energy absorption device to maintain a predetermined fluid pressure in the adaptive energy absorption device.

In some embodiments, the seat pan may be pivotally and/or translatably coupled to the seat frame and the adaptive energy absorption device may be positioned in direct physical contact with the seat pan of the at least one seat position.

In some embodiments, the fluid supplied by the fluid supply source may be helium.

In some embodiments, the seat frame may define a plurality of laterally adjacent seat positions, wherein the seat pans of the laterally adjacent seat positions may be coupled together.

In some embodiments, the adaptive energy absorption device may be expandable from a partially inflated condition when disposed beneath the seat pan of the at least one seat position to a fully inflated condition when removed from beneath the seat pan of the at least one seat position for use as the emergency flotation device.

In another aspect, embodiments of the inventive concepts are directed to a combination adaptive energy absorption and emergency flotation device for positioning beneath a plurality of seat pans of an aircraft seat assembly. The device includes a plurality of fluidly coupled inflatable elastic bladders arranged to form a vertical stack, at least one constrictor valve fluidly coupling at least two adjacent ones of the plurality of inflatable elastic bladders, the at least one constrictor valve allowing fluid flow therethrough in response to predetermined pressure on the adaptive energy absorption device from the plurality of seat pans, and a fluid supply source fluidly coupled to the plurality of inflatable elastic bladders operable for outputting a positive flow of fluid to the plurality of inflatable elastic bladders, wherein the adaptive energy absorption device is detached from the plurality of seat pans to allow removal from beneath the plurality of seat pans for use as an emergency flotation device.

In some embodiments, the device may further include at least one pressure relief valve disposed in one of the plurality of inflatable elastic bladders allowing fluid escape out of the plurality of inflatable elastic bladders responsive to predetermined pressure on the plurality of inflatable elastic bladders from the plurality of seat pans.

In some embodiments, the device may be coupled to or may include a controller communicatively coupled to the fluid supply source operable for activating the fluid supply source to output fluid to the plurality of inflatable elastic bladders to maintain a predetermined fluid pressure in the plurality of inflatable elastic bladders.

Embodiments of the inventive concepts can include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element; feature, or function. In the drawings.

DETAILED DESCRIPTION

Figure 1:
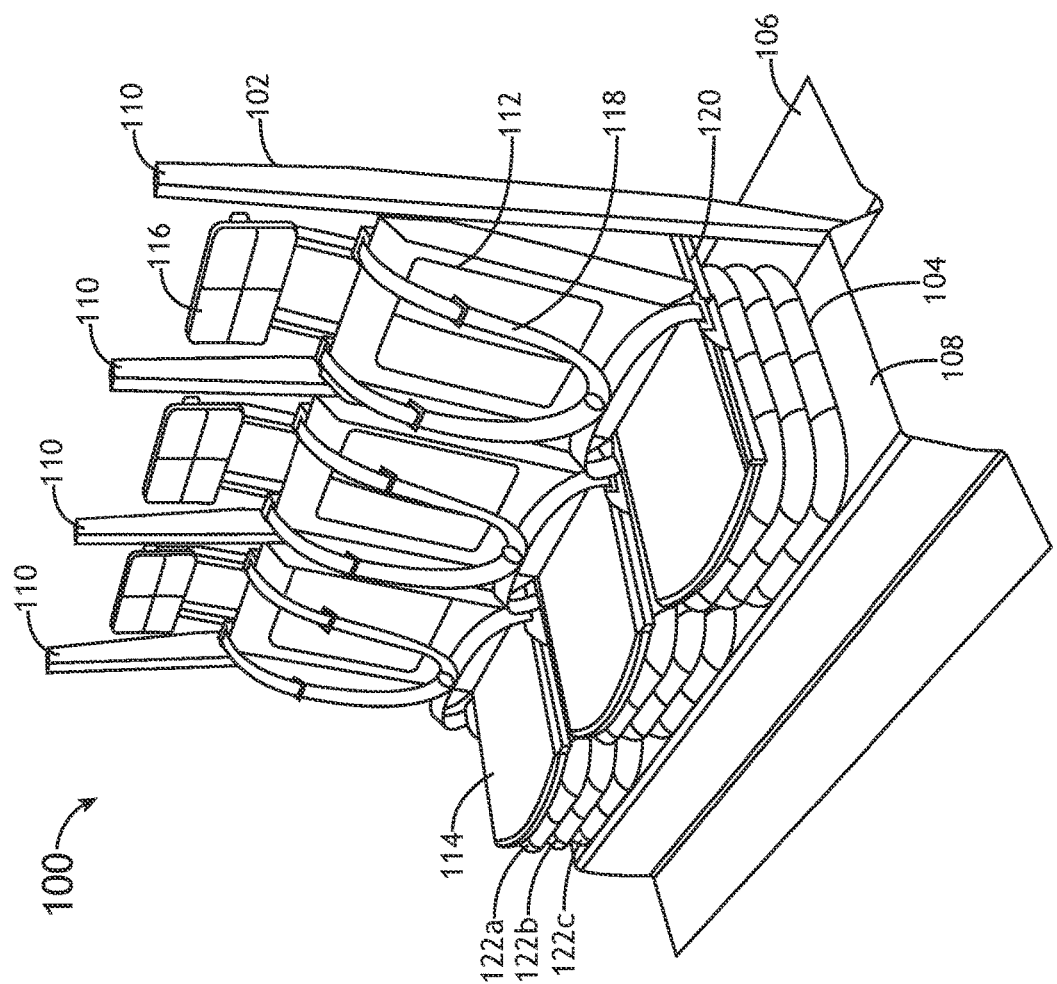
FIG. 1 shows a perspective view of a seating system including a plurality of passenger seats positioned in relation to a combination adaptive energy absorption and emergency flotation device according to an embodiment of the present disclosure.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly speaking, embodiments of the inventive concepts disclosed herein are directed to a combination energy absorption and emergency flotation device compatible for use with a seating system, for instance a seating system employed in a rotary wing aircraft, and a seating system including the combination device employable in an aircraft, for instance a rotary wing aircraft. In some embodiments, the device may be further configured and operable for vibration mitigation in the associated seat structure for reducing or preventing vibrations from transferring to the seat occupant(s). Benefits of the embodiments described herein include an overall reduction in the number of necessary singular aircraft systems in an aircraft, thereby reducing weight and complexity, among other advantages.

FIG. 1 illustrates a perspective view of a seating system 100 for an aircraft or other conveyance. The seating system 100 is particularly well suited for employment in rotary wing aircraft such as a helicopter. The seating system 100 generally includes a seat frame 102 defining at least one seat position, and an adaptive energy absorption device 104 positioned beneath portions of the seat frame 102 and interacting therewith. As shown, portions of the seat frame 102 are mounted on a floor 106 installed in the aircraft. In some embodiments, the floor 106 may include a raised platform 108 on which the energy absorption device 104 is mounted. The raised platform 108 may serve to position the adaptive energy absorption device 104 elevated above the floor while providing an ergonomic seat height.

As shown, the seat frame 102 includes a plurality of generally vertically oriented and parallel frame members 110 positioned in spaced-apart relation. Each group of adjacent frame members 110 defines a seating position therebetween. As shown, the seat frame includes four frame members 110 defining three seat positions. Embodiments of the invention can include a singular seat, seat groupings including two laterally adjacent seats, seat groupings including three laterally adjacent seats, and seat groupings including more than three laterally adjacent seats. Each seat position generally includes a seat back 112 and a seat pan 114 coupled to and supported by the frame members 110. In some embodiment, the seat back 112 and the seat pan may be independently coupled to the frame members 110. In other embodiments, the seat back 112 and the seat pan 114 may be coupled together and one or both elements coupled to the frame members 110. The seat frame 102 is compatible with seat back recline and seat pan tilt mechanisms operable for adjusting the seating position for enhanced comfort. Each seat position may optionally include a headrest 116 mounted to the seat back 112, which may or may not be adjustable. Although not shown, each seat position may be equipped with one or more deployable or fixed armrests, and a single armrest may be shared between laterally adjacent seats.

Each seat is preferably equipped with a passenger restraint 118. Each passenger restraint 118 may include a lap belt and at least one shoulder belt configured as a multi-point harness, for instance the 5-point harness as shown or optionally a 3-point harness. The lap belt portion of the passenger restraint 118 may anchor to seat pan frame members 120 coupled to the generally vertical frame members 110. In some embodiments, each passenger restraint 118 may be equipped with at least one pretensioner and the shoulder harness may include an inflatable element.

Each seat pan 114 may be pivotally coupled to the seat pan frame members 120 to allow pivoting movement between a raised and a lowered seat pan position. In some embodiments, the plurality of seat pans 114 may be coupled together. In an alternative embodiment each of the plurality of seat pans 114 may be translatably coupled to the frame members 110 to allow vertical translation. The energy absorption device 104 is disposed beneath the seat pan 114 in embodiments including a singular seat position, and beneath the seat pans 114 in embodiments including two or more laterally adjacent seat positions.

Figure 2:
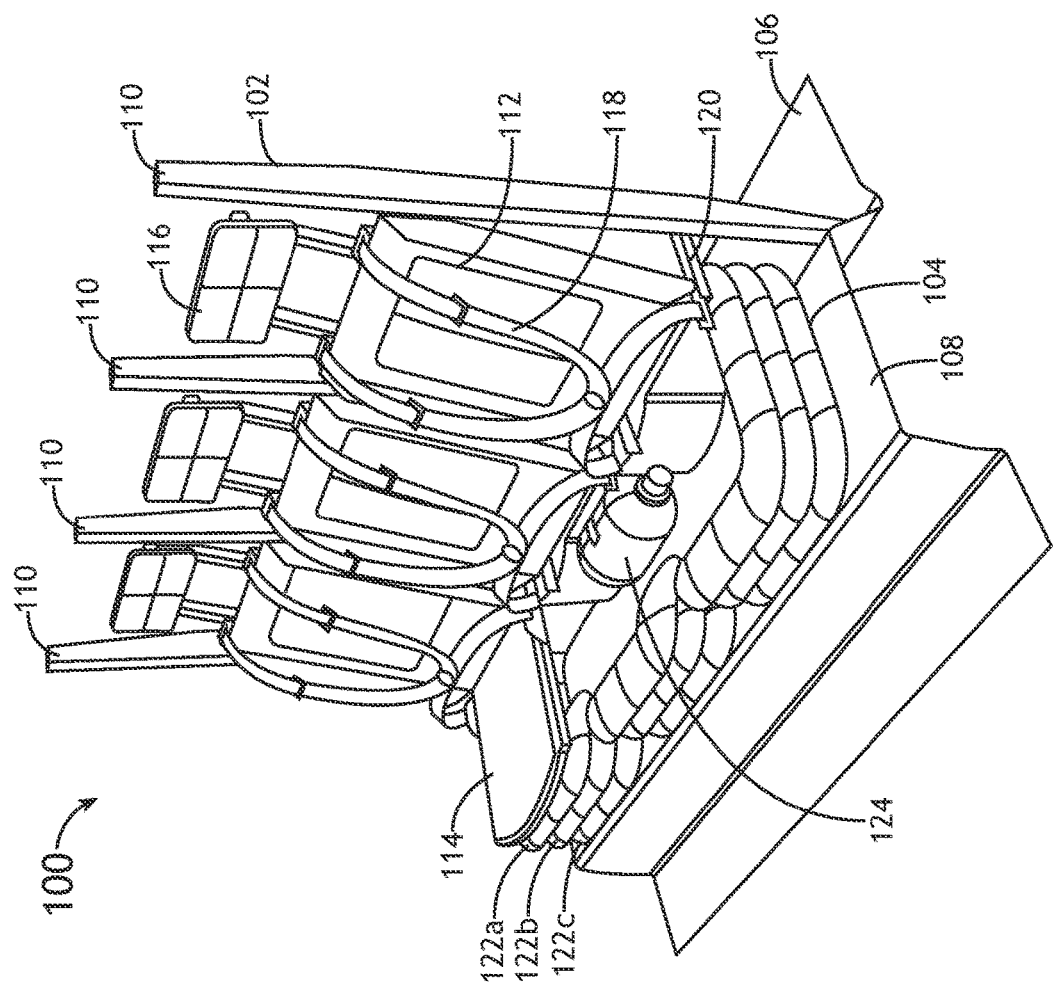
FIG. 2 shows the seating system of FIG. 1 with laterally adjacent seat pans removed to show the underlying combination device.

Referring to FIG. 2, the energy absorption device 104 is preferably a singular device that extends continuously across the one or more seat positions. As shown, the adaptive energy absorption device 104 is a singular device extending across all three seat positions and includes a plurality of inflatable elastic bladders 122a, 122b, 122c, as discussed further below. In some embodiments, the inflatable elastic bladders 122a, 122b, 122c are arranged in a vertical stack in which a 'top' bladder 122a is positioned proximate a bottom of the seat pan or pans 114, a 'bottom' bladder 122c is positioned proximate the platform 108 or floor 106, and a 'middle' bladder 122b positioned between the 'top' bladder 122a and the 'bottom' bladder 112c. Other configurations of the adaptive energy absorption device 104 may include, but are not limited to, a singular inflatable elastic bladder or two or more inflatable elastic bladders arranged in a predetermined configuration.

In some embodiments, the adaptive energy absorption device 104 has an annular shape, although other shaped are envisioned. As shown, the adaptive energy absorption device 104 has a footprint that generally corresponds to the length and width dimensions of the seat positions of the seat frame 102, collectively. Thus, the adaptive energy absorption device 104 extends generally from one lateral extent of one seat pan 114 to the opposing lateral extent of the opposing seat pan 114, and from a forward extent of the seat pans 114 to an aft extent of the seat pans 114. In some embodiments, the height of the adaptive energy absorption device 104 in an at least partially inflated state corresponds to a distance between the floor 106 or platform 108 to a bottom of the seat pans 114. The adaptive energy absorption device 104 substantially fills the space between the bottom of the seat pans 114 and the top of the floor 106 or platform 108 such that the adaptive energy absorption device 104 is in direct physical contact with each of the floor 106 or platform 108 and the seat pan(s) 114 to provide energy absorption functionality and/or vibration mitigation functionality as discussed further below.

The adaptive energy absorption device 104 is fluidly coupled with a fluid supply source 124 fluidly coupled to the at least one inflatable elastic bladder 122a, 122b, 122c. The fluid supply source 124 is operable for outputting a positive flow of fluid to the at least one inflatable elastic bladder 122a, 122b, 122c. In some embodiments, the fluid may be a gas such as air or helium. Helium may be preferable in particular embodiments for weight reduction. The fluid supply source 124 may be disposed within an interior portion defined by the adaptive energy absorption device 104 in an attached state or a detached state. In some embodiments, the fluid supply source 124 may be fluidly coupled to the at least one inflatable bladder 122a, 122b, 122c via a one-way valve and include a quick-disconnect fitting for detaching the coupling line in the event of an emergency in which the adaptive energy absorption device 104 is utilized as a flotation device, as discussed further below.

Figure 3:
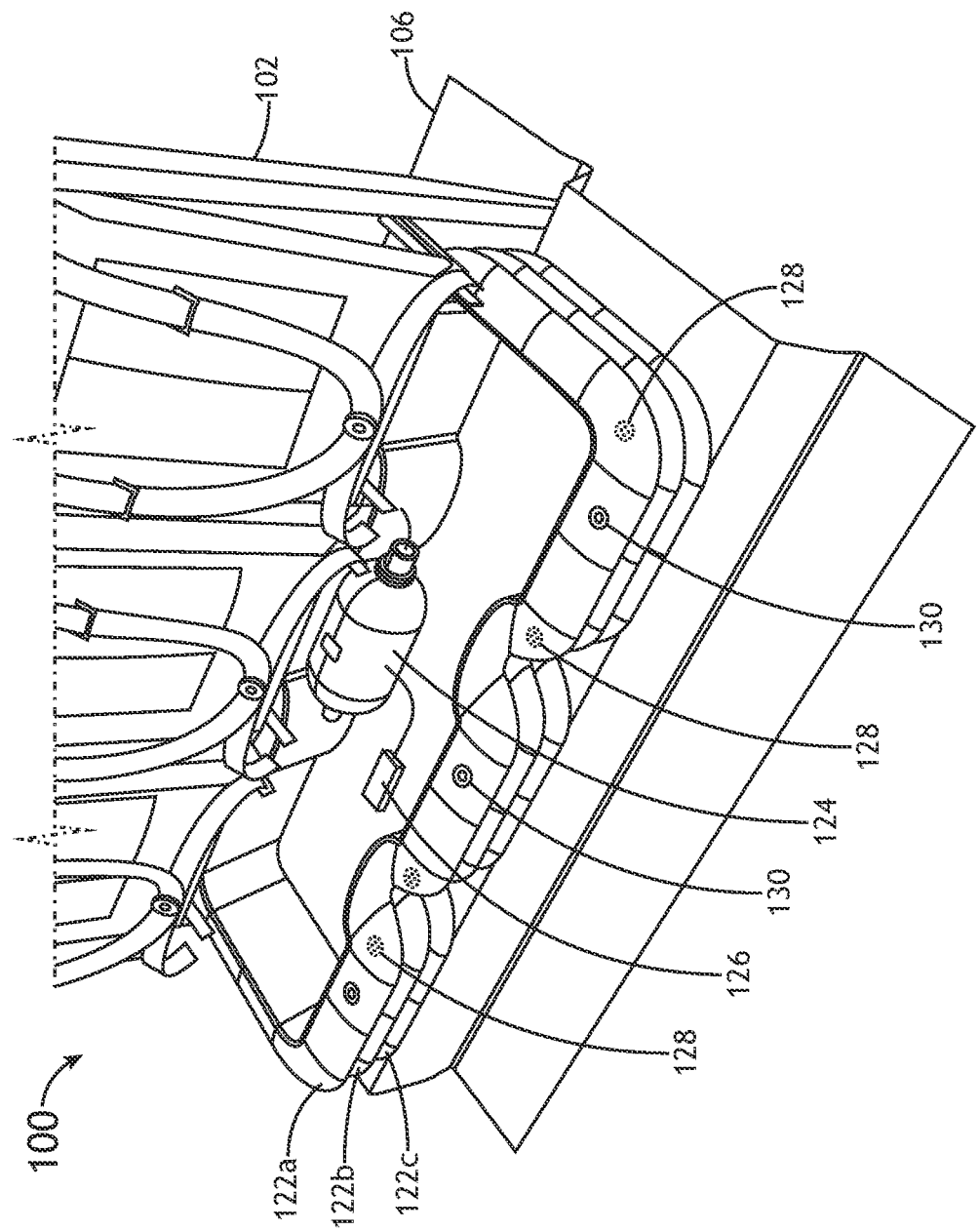
FIG. 3 shows a detailed view of the seating system of FIG. 1 with all seat pans removed to show the underlying combination device.

Referring to FIG. 3, the fluid supply source 124 may be communicatively coupled with a controller 126 operable for receiving an input signal and generating a command signal in response to the input signal for instructing the fluid supply source 124 to supply fluid to the adaptive energy absorption device 104. In some embodiments, the controller 126 is operable for activating the fluid supply source 124 to maintain a predetermined fluid pressure in the adaptive energy absorption device 104.

The adaptive energy absorption device 104 may include at least one relief constrictor valve 128 disposed between adjacent ones of the plurality of inflatable elastic bladders. For example, responsive to pressure applied to the adaptive energy absorption device 104 from movement of the at least one seat pan 114, for instance in the case of extreme vehicle movement, fluid disposed in the 'top' inflatable elastic bladder 122a may transfer to the 'middle' inflatable elastic bladder 122b via the at least one relief constructor valve disposed between and fluidly coupled to the adjacent bladders. Upon removal of the applied force, the fluid may be allowed to return the 'top' inflatable elastic bladder 122a to reset for the next energy impact attenuation event. Relief constrictor valves 128 may be disposed in any position and between any adjacent layers for allowing fluid passage and return between adjacent inflatable elastic bladders in the respective presence and absence of force applied to the adaptive energy absorption device 104.

The adaptive energy absorption device 104 may further include at least one pressure relief valve 130 disposed in at least one of the inflatable elastic bladders 122a, 122b, 122c, operable for relieving pressure in the at least one of the inflatable elastic bladders 122a, 122b, 122c such that fluid pressure does not increase, as a result of seat pan force applied to the adaptive energy absorption device 104, beyond a predetermined amount depending on the precharge pressure in the at least one of the inflatable elastic bladders 122a, 122b, 122c.

Figure 4:
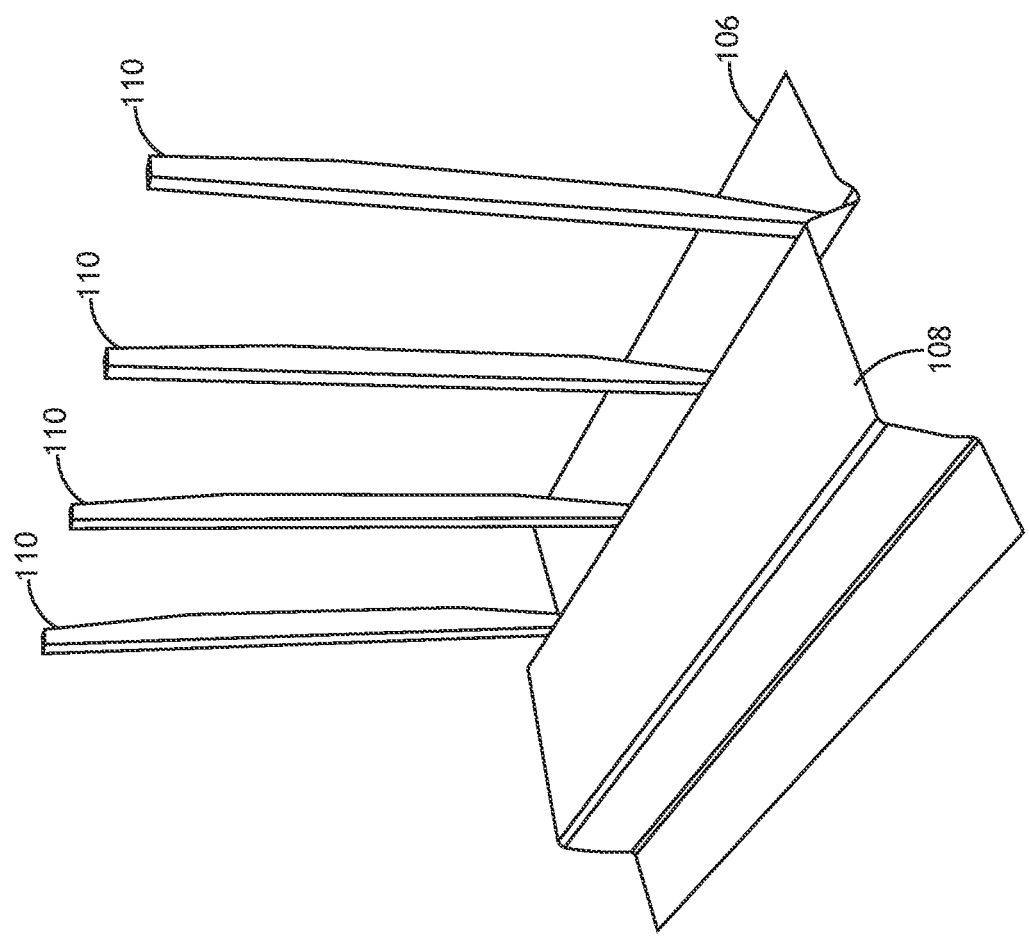
FIG. 4 shows a perspective view of the seat frame of the seating system.

Referring to FIG. 4, a non-limiting example of parallel seat frame members 110, their respective coupling to the floor 106, and their positional relationship to the platform 108 is shown. As shown, the frame members 110 define the plurality of seat positions and their positional relationship relative to the forward platform 108.

Figure 5:
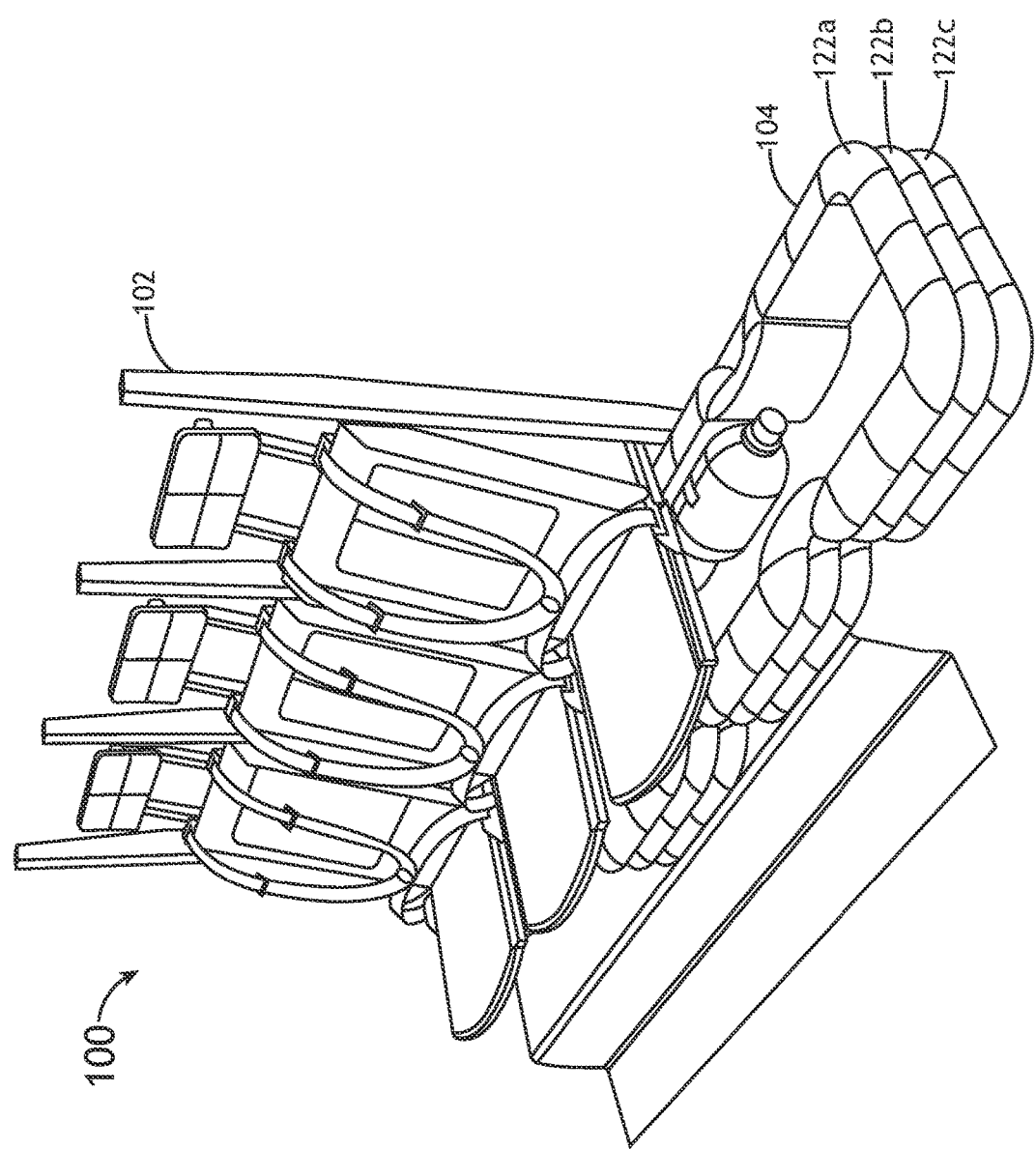
FIG. 5 shows the combination device being removed from beneath the seat assembly for emergency use.

Referring to FIG. 5, the adaptive energy absorption device 104 is detached from the seat frame 102 such that the adaptive energy absorption device 104 can be removed as needed for use as an emergency flotation device in the event of a water landing/crash. In the operative position disposed beneath the seat pan(s), the adaptive energy absorption device 104 serves to absorb impact energy from the seat pan(s) and/or reduce or prevent vibrations from transferring to the seat occupant via direct physical contact with the seat pan(s) as discussed above. The adaptive energy absorption device 104 can be removed by pulling the device from beneath the seat, for instance in a forward or lateral direction relative to the seat positions, to remove the device from the aircraft.

Figure 6:
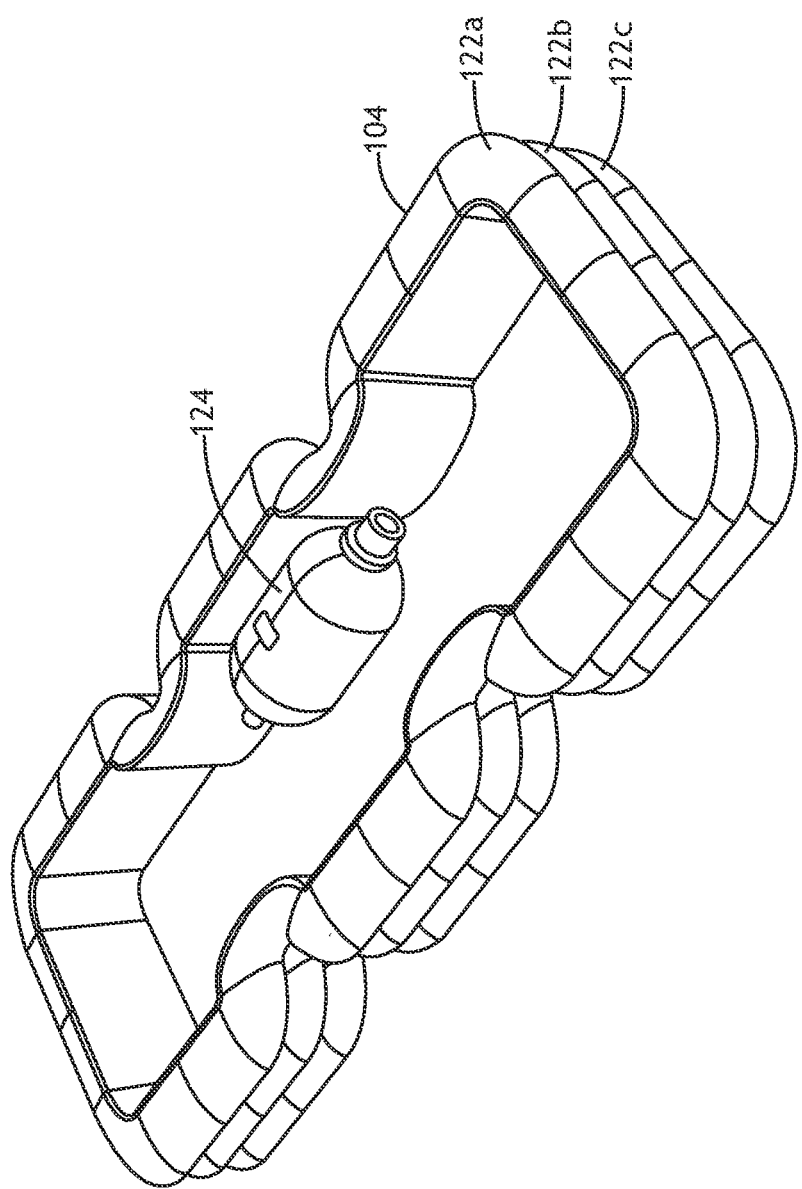
FIG. 6 shows a perspective view of the combination device in a partially inflated condition for use as an energy absorber.
Figure 7:
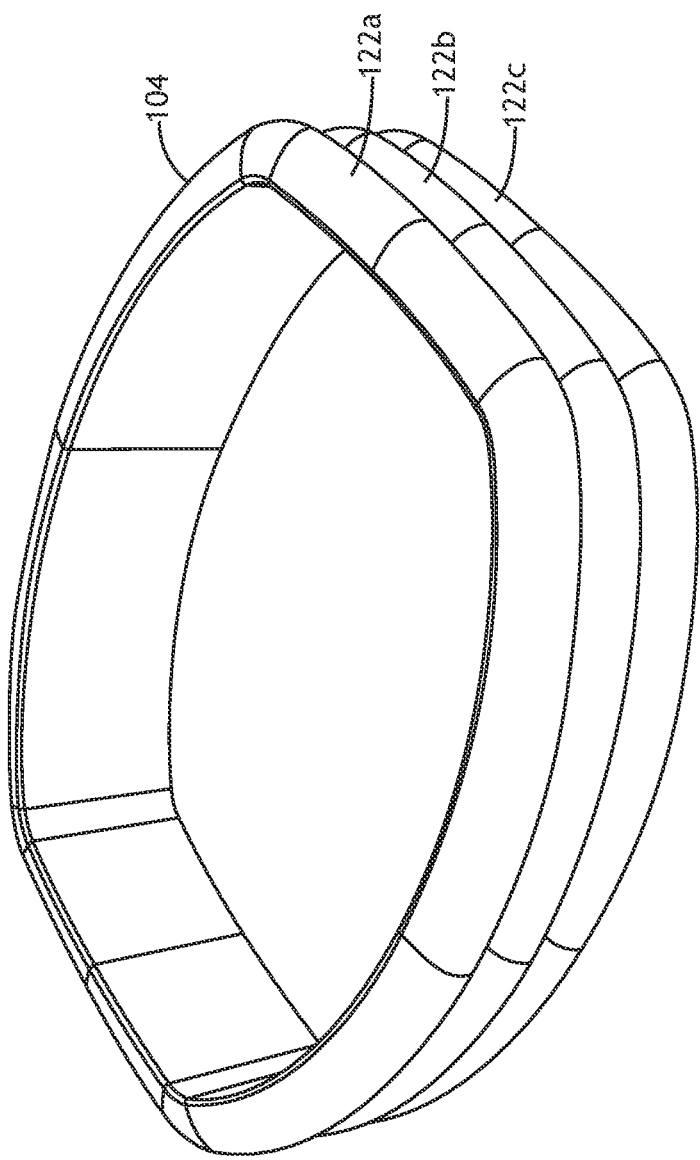
FIG. 7 shows a perspective view of the combination device in a fully inflated condition for use as an emergency flotation device.

Referring to FIG. 6, the adaptive energy absorption device 104 is shown removed from the seat assembly and in a partially inflated condition for use as the impact energy attenuation and/or vibration mitigation device. In the partially inflated state, the device 104 has a shape generally corresponding to the shape of the seat pans, collectively. Referring to FIG. 7, the adaptive energy absorption device 104 is shown in a fully inflated condition for use as an emergency flotation device, for instance a life raft. As compared to the partially inflated condition, the fully inflated condition expands the footprint of the device to form a life raft. The life raft may include an attached floor that expands in the fully inflated condition. The air supply 124 may or may not remain fluidly coupled to the adaptive energy absorption device 104 after removal from beneath the seat pans 114. In some embodiments, the air supply 124 is configured to inflate the adaptive energy absorption device 104 via the pressurized gas contained therein when activated.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A seating system for an aircraft, comprising:
    a seat frame defining at least one seat position, each seat position including a seat back and a seat pan coupled to the seat frame;
    an adaptive energy absorption device disposed beneath the seat pan of the at least one seat position, the adaptive energy absorption device comprising a plurality of fluidly coupled inflatable elastic bladders and at least one constrictor valve for allowing fluid to flow from one of the plurality of inflatable elastic bladders in response to predetermined pressure on the adaptive energy absorption device from the seat pan of the at least one seat position; and
    a fluid supply source fluidly coupled to the at least one inflatable elastic bladder operable for outputting a positive flow of fluid to the at least one inflatable elastic bladder;
    wherein the adaptive energy absorption device is detached from the seat frame to allow removal from beneath the seat pan of the at least one seat position for use as an emergency flotation device.

2. The seating system according to claim 1, wherein the seat frame defines at least two laterally adjacent seat positions and the adaptive energy absorption device spans continuously across the at least two laterally adjacent seat positions.

3. The seating system according to claim 1, wherein the plurality of fluidly coupled inflatable elastic bladders are to form a vertical stack.

4. The seating system according to claim 1, wherein the at least one constrictor valve is disposed between fluidly coupled adjacent ones of the plurality of inflatable elastic bladders to allow fluid to flow between the fluidly coupled adjacent ones of the plurality of inflatable elastic bladders.

5. The seating system according to claim 1, wherein the at least one constrictor valve is disposed in one of the plurality of inflatable elastic bladders to allow fluid escape out of the adaptive energy absorption device.

6. The seating system according to claim 1, further comprising a controller communicatively coupled to the fluid supply source operable for activating the fluid supply source to output fluid to the adaptive energy absorption device to maintain a predetermined fluid pressure in the adaptive energy absorption device.

7. The seating system according to claim 1, wherein the seat pan is pivotally and/or translatably coupled to the seat frame and the adaptive energy absorption device is positioned in direct physical contact with the seat pan of the at least one seat position.

8. The seating system according to claim 1, wherein fluid supplied by the fluid supply source is helium.

9. The seating system according to claim 1, wherein the seat frame defines a plurality of laterally adjacent seat positions, and wherein the seat pans of the laterally adjacent seat positions are coupled together.

10. The seating system according to claim 1, wherein the adaptive energy absorption device is expandable from a partially inflated condition when disposed beneath the seat pan of the at least one seat position to a fully inflated condition when removed from beneath the seat pan of the at least one seat position for use as the emergency flotation device.

* * * * *